United States Patent
Sedlar et al.

(10) Patent No.: US 8,800,996 B2
(45) Date of Patent: Aug. 12, 2014

(54) LOW TORQUE RADIAL SHAFT SEAL ASSEMBLY

(75) Inventors: Brent R. Sedlar, Ann Arbor, MI (US); David M. Toth, Brighton, MI (US)

(73) Assignee: Federal-Mogul Corporation, Southfield, MI (US)

(*) Notice: Subject to any disclaimer, the term of this patent is extended or adjusted under 35 U.S.C. 154(b) by 137 days.

(21) Appl. No.: 13/423,365

(22) Filed: Mar. 19, 2012

(65) Prior Publication Data

US 2012/0235362 A1  Sep. 20, 2012

Related U.S. Application Data

(60) Provisional application No. 61/453,577, filed on Mar. 17, 2011.

(51) Int. Cl.
*F16J 15/32* (2006.01)

(52) U.S. Cl.
USPC .................... 277/562; 277/549; 277/568

(58) Field of Classification Search
USPC ............. 277/549, 551, 559, 560, 562, 568
See application file for complete search history.

(56) References Cited

U.S. PATENT DOCUMENTS

| | | | | |
|---|---|---|---|---|
| 4,336,945 A | * | 6/1982 | Christiansen et al. | 277/559 |
| 4,613,143 A | * | 9/1986 | Butler | 277/569 |
| 4,844,480 A | | 7/1989 | Gralka | |
| 4,995,621 A | | 2/1991 | Devouassoux et al. | |
| 5,398,942 A | | 3/1995 | Duckwall et al. | |
| 5,556,112 A | * | 9/1996 | Brandt | 277/560 |
| 6,053,502 A | | 4/2000 | Hallenstvedt | |
| 6,428,013 B1 | | 8/2002 | Johnston et al. | |
| 6,513,810 B1 | | 2/2003 | Pataille | |
| 6,620,361 B1 | | 9/2003 | Longtin et al. | |
| 6,726,211 B1 | | 4/2004 | Kuroki et al. | |
| 6,729,624 B1 | | 5/2004 | Johnston | |
| 6,921,080 B2 | | 7/2005 | Johnen | |
| 6,921,082 B2 | | 7/2005 | Lutaud | |
| 7,100,924 B2 | | 9/2006 | Toth et al. | |
| 7,891,670 B2 | | 2/2011 | Alajbegovic | |
| 2004/0056427 A1 | | 3/2004 | Rapp et al. | |
| 2005/0121858 A1 | | 6/2005 | Oricchio, Jr. | |
| 2005/0242521 A1 | | 11/2005 | Bock et al. | |
| 2005/0285350 A1 | | 12/2005 | Oricchio, Jr. | |
| 2006/0012128 A1 | | 1/2006 | Lutaud | |

(Continued)

OTHER PUBLICATIONS

International Search Report PCT/US2012/029614 mailed on Jun. 25, 2012.

*Primary Examiner* — Gilbert Lee
(74) *Attorney, Agent, or Firm* — Robert L. Stearns; Dickinson Wright, PLLC (57) ABSTRACT

A shaft seal assembly includes a metal case having an annular leg extending radially inwardly to a free end with opposite oil and air sides of the leg facing respective oil and air sides of the seal assembly. An elastomeric material bonded to the leg forms a main body adjacent the free end and a primary seal lip radially inwardly from the main body. The primary seal lip has a sealing surface that extends between an air side end and free oil side end. The air side end is attached to an annular bridge via a first hinge and the bridge is operably attached to the main body via a second hinge. The first and second hinges each have a thickness that is less than a thickness of the bridge and the thickness of the first hinge is less than a thickness of the primary seal lip.

10 Claims, 8 Drawing Sheets

(56) References Cited

U.S. PATENT DOCUMENTS

| | | |
|---|---|---|
| 2006/0091614 A1 | 5/2006 | Oricchio, Jr. |
| 2007/0257446 A1 | 11/2007 | Tanida et al. |
| 2008/0309024 A1 | 12/2008 | vom Schemm |
| 2010/0038863 A1 | 2/2010 | Nakagawa et al. |
| 2010/0187768 A1 | 7/2010 | Sedlar et al. |
| 2010/0194055 A1 | 8/2010 | Syamoto |
| 2010/0237567 A1 | 9/2010 | Kurth et al. |
| 2010/0244390 A1 | 9/2010 | Berdichevsky et al. |
| 2011/0095486 A1 | 4/2011 | Nakagawa |
| 2011/0204578 A1 | 8/2011 | Uhrner et al. |
| 2011/0221143 A1 | 9/2011 | Toth et al. |
| 2011/0241296 A1 | 10/2011 | Ting et al. |
| 2011/0316238 A1 | 12/2011 | Schmitt |
| 2012/0007319 A1 | 1/2012 | Miura et al. |

* cited by examiner

LOW TORQUE RADIAL SHAFT SEAL ASSEMBLY

CROSS-REFERENCE TO RELATED APPLICATION

This application claims the benefit of U.S. Provisional Application Ser. No. 61/453,577, filed Mar. 17, 2011, which is incorporated herein by reference in its entirety.

BACKGROUND OF THE INVENTION

1. Technical Field

This invention relates generally to seal assemblies, and more particularly to rotary shaft seal assemblies.

2. Related Art

Shaft seals are commonly used throughout numerous types of vehicle applications. Aside from the shaft seal establishing a reliable seal against a running surface of a rotating shaft or wear sleeve, both to prevent the ingress of contamination and the egress of desirable lubrication, it is desirable that the seal provide a minimal running torque against the shaft. A reduced running torque of the seal helps to enhance the overall fuel economy of the vehicle, as lower torque requires less parasitic horse power to turn the shaft, such as a crankshaft, for example, due to less drag produced by the shaft seal against the running surface of the shaft. Unfortunately, compromises are generally necessary in order to accomplish either a maximized seal or minimized friction with the shaft. Further, it is also desirable that the seal lip be easily and properly installed onto the shaft. Unfortunately, sometimes the seal lip becomes unknowingly inverted during installation, thereby resulting in problems in use.

A shaft seal constructed in accordance with the subject invention addresses the need to accomplish both a reliable seal and minimized friction, while also being readily installable on a shaft in an air-side installation without concern of inadvertent seal lip inversion.

SUMMARY OF THE INVENTION

A shaft seal assembly includes an annular metal case having an annular leg extending radially inwardly toward a central axis of the seal assembly to a free end. The leg has opposite oil and air sides facing respective oil and air sides of the seal assembly. Further, an elastomeric material is bonded to the leg. The elastomeric material forms a main body immediately adjacent the free end of the leg and further provides an annular primary seal lip radially inwardly from the main body. The primary seal lip has a thickness extending between a radially outwardly facing backing surface and a radially inwardly facing sealing surface. The sealing surface extends along a full length of the primary seal lip from an air side end to a free oil side end that extends toward the oil side of the seal assembly. The sealing surface is configured to extend parallel to the central axis along its length against a shaft running surface. The air side end is attached to an annular bridge formed from the elastomeric material via a first hinge. The bridge is operably attached to the main body via a second hinge. The bridge has opposite sides extending across a thickness of the bridge. The first hinge and second hinge each have a thickness that is less than the thickness of the bridge and the thickness of the first hinge is also less than the thickness of the primary seal lip.

As such, the first and second hinges work together to ensure that the sealing surface of the primary seal lip is brought into proper sealing abutment with a shaft running surface. Further, the flexible first and second hinges in combination with the less flexible primary seal lip, having an increased thickness, allow the primary seal lip to provide the primary source of loading against the shaft running surface.

In accordance with another aspect of the invention, the shaft seal assembly includes an auxiliary lip operably attached to the main body and extending to a free end configured to abut the running surface of the shaft, wherein the free end faces the oil side of the seal assembly in combination with the primary seal lip. With the primary and auxiliary seal lips both facing the oil side of the seal assembly upon being brought into their proper functioning relation with the shaft, an air-side assembly process of the shaft through the seal assembly is made easy, with there being no concern of inadvertently inverting one of the seal lips.

In accordance with another aspect of the invention, the auxiliary lip is provided having a thickness extending across opposite sides immediately adjacent the main body, wherein the auxiliary lip is operably attached to the main body by an auxiliary hinge having a thickness less than the thickness of said auxiliary lip. As such, the auxiliary hinge facilitates minimizing the running friction generated between the auxiliary lip and the running surface of the shaft.

In accordance with another aspect of the invention, the seal assembly further includes a secondary auxiliary lip extending from the auxiliary lip. The secondary auxiliary lip extends toward the air side of the shaft seal assembly to a free end, wherein the secondary auxiliary lip further inhibits contamination from entering the oil side of the seal assembly.

In accordance with another aspect of the invention, the secondary auxiliary lip is configured to abut the running surface of the shaft. As such, an enclosed annular pocket is formed between the auxiliary lip and the secondary auxiliary lip which can facilitate formation of a hydrodynamic lubrication film and further inhibit lubrication from exiting to the air side of the seal assembly.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
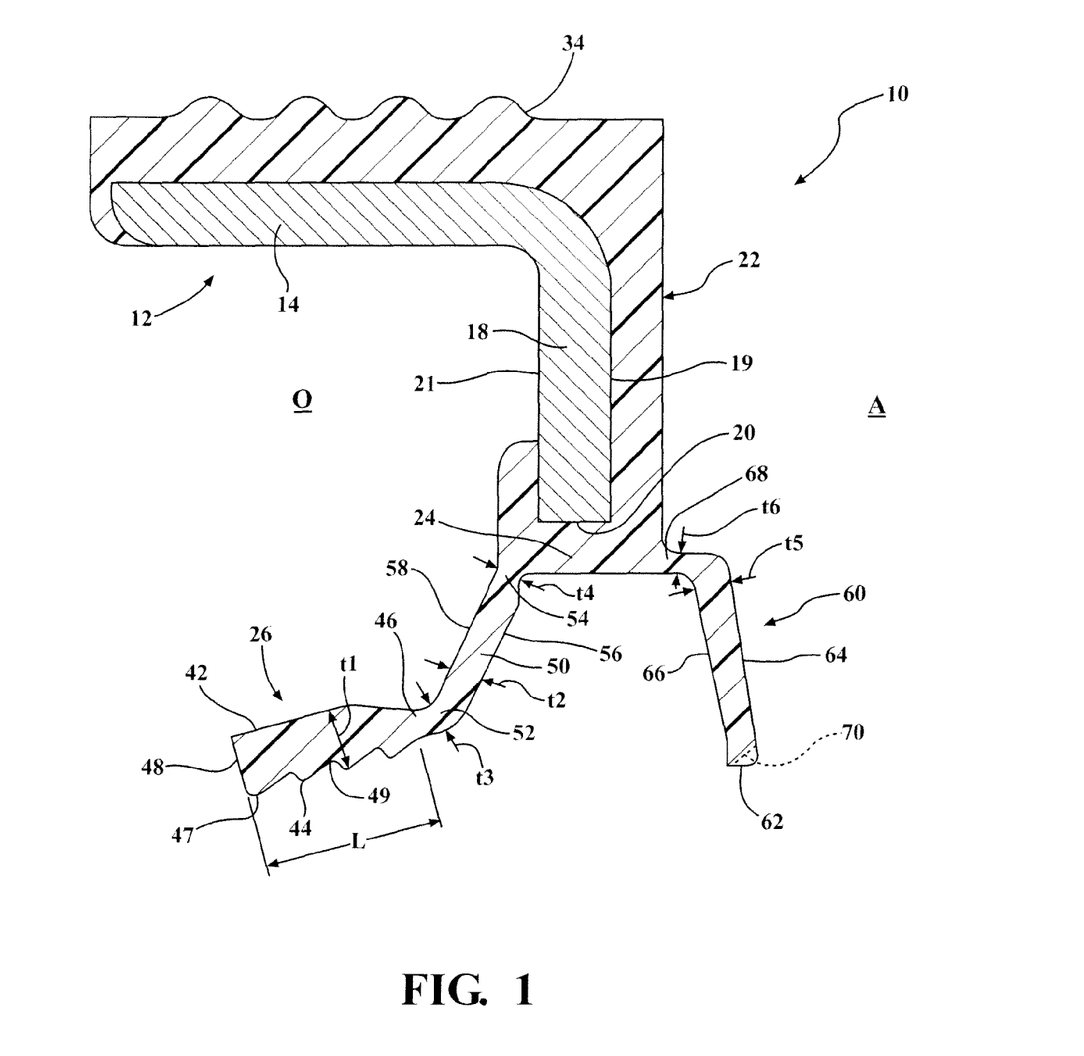
FIG. 1 is a cross-sectional view of a shaft seal assembly constructed in accordance with one aspect of the invention shown in an uninstalled state.

Referring in more detail to the drawings, FIGS. 1 (uninstalled) and 1A (installed) illustrate a rotary radial shaft seal assembly, referred to hereafter as assembly 10, constructed in accordance with one aspect of the invention. The assembly 10 has an annular outer metal shell, also referred to as case 12, represented here, by way of example and without limitation, as being generally L-shaped, having an annular cylindrical or substantially cylindrical outer wall 14 that extends circumferentially about a central axis 16 (FIG. 1A) of the assembly 10 and an annular leg 18 that extends along a plane radially inwardly from the wall 14 toward the central axis 16 to a free end 20. The leg 18 has opposite air and oil sides 19, 21 facing the air A and oil sides O of the seal assembly, respectively. It should be recognized that the shape of the case 12 is not limited to the shape illustrated, and that any suitable shape is contemplated to be within the scope of the claims. The assembly 10 further includes an elastomeric material 22, e.g. low cost rubber, bonded to the leg 18, with the elastomeric material 22 forming a main body 24 immediately adjacent the free end 20. The elastomeric material 22 also forms an annular primary seal lip 26 radially inwardly from the main body 24. The primary seal lip 26 is configured to facilitate trouble free installation of a shaft 28 (FIG. 1A) through the seal assembly 10 in an air-side installation process, wherein the shaft 28 is inserted from an air-side A of the seal assembly 10 through the seal assembly 10 toward an oil side O of the seal assembly 10 (typically done by installing the seal assembly 10 with a housing 29 (FIG. 1A) and then inserting the shaft 28 through the seal assembly 10, though the seal assembly 10 need not be first installed in the housing 29). The trouble free installation results in the primary seal lip 26 be brought into proper sealing abutment with a running surface 30 of the shaft 28 without concern of the primary seal lip 26 being inadvertently inverted.

Figure 1A:
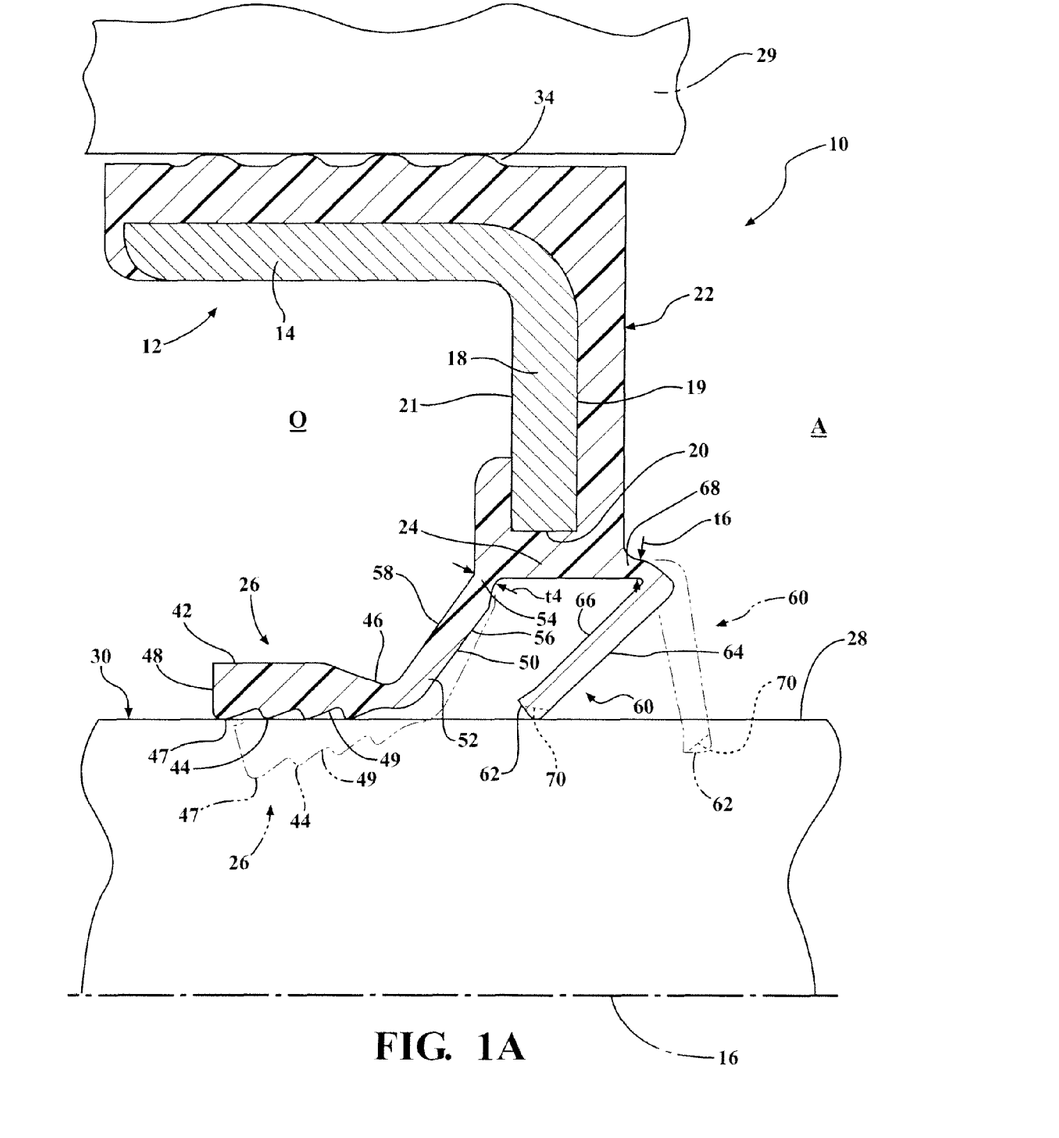
FIG. 1A is a view of the shaft seal assembly of FIG. 1 shown in dashed line in the uninstalled state and in solid line an installed state on a shaft.

The elastomeric material 22, aside from forming the main body 24 and the primary seal lip 26, can be molded about an entire or substantially entire outer surface 32 of the case 12. As such, a radially outermost portion 34 of the elastomeric material 22 can be molded about the outer surface 32 of the outer wall 14, wherein the outermost portion 34 is sized on diameter to be received in a bore of the housing 29, such as in a line-to-line or slight interference press fit. In addition, the elastomeric material 22 can be molded to extend at least partially about the leg 18, shown as extending completely over the air-side 19 of the leg 18 and partially over the oil-side 21 of the leg 18, with the main body 24 traversing the free end 20. Accordingly, the entire outer air side surface 19 of the leg 18 can be covered with the elastomeric material 20, thereby providing protection against to the case 12 against corrosion.

The primary seal lip 26 is molded having a thickness t1 (FIG. 1) extending between a radially outwardly facing backing surface 42 and a radially inwardly facing sealing surface 44. The sealing surface 44 extends along a length L of the primary seal lip 26 from an air side end 46 to a free oil side end 48 facing the oil side O of the seal assembly 10. The entire sealing surface 44 is configured to extend parallel to the central axis 16 along its full length L against the shaft running surface 30 upon installation and during use. The sealing surface 44 is shown having an annular, circumferentially continuous lip, also referred to as rib 47 immediately adjacent the free oil side end 48, with a helical groove 49 extending immediately from the rib 47 toward the air side end 46. Accordingly, although the rib 47 inhibits lubrication from exiting the oil side O of the assembly 10, if some lubrication should flow past the rib 47, the groove 49 is configured to pump the lubrication back toward the oil side O. The air side end 46 is operably attached to the main body 24 via an annular bridge 50 formed from the elastomeric material 22. The bridge 50 is attached to the air side end 46 via a first hinge 52 and to the main body 24 via a second hinge 54. The annular bridge 50 has opposite sides 56, 58 extending across a thickness t2 (FIG. 1), shown as being constant or substantially constant along the full length of the bridge 50. The first hinge 52 and the second hinge 54 have respective thicknesses t3, t4 (FIG. 1) that are less than the thickness t2 of the bridge 50, and the thickness t3 of the first hinge 52 is less than the thickness t1 of the primary seal lip 26.

The elastomeric material 22 is further molded to form an annular auxiliary lip 60. The auxiliary lip 60 extends radially inwardly from the main body 24 to a free end 62 on the air side A of the assembly 10 relative to the primary seal lip 26. The auxiliary lip 60 has a thickness t5 (FIG. 1) extending across opposite sides 64, 66 immediately adjacent the main body 24. The auxiliary lip 60 is attached to the main body 24 by an auxiliary hinge 68. The auxiliary hinge 68 has a thickness t6 that is less than the thickness t5 of the auxiliary lip 60. As such, the auxiliary hinge 68 functions as a primary flex point for the auxiliary lip 60, thereby tending to flex in advance and to a greater extent than the remaining portion of the auxiliary lip 60. The auxiliary lip 60 is configured to abut the shaft with the free end 62 facing (pointing toward) the primary seal lip 26, and thus, facing (pointing toward) the oil side O of the assembly 10. To facilitate maintaining an equalized pressure gradient between the oil side O and the air side A, the auxiliary seal lip 60 can have one or more notches, also referred to as vents 70, extending into the free end 62.

As shown in FIG. 1A, upon assembling the shaft 28 through the seal assembly 10, the bridge 50 and auxiliary seal lip 60 extend in parallel or substantially parallel relation with one another, with both the free ends 48, 62 of the respective primary and auxiliary seal lips 26, 60 facing the oil side O of the assembly 10. As shown in FIG. 1, the auxiliary seal lip 60, while in its uninstalled state, has its free end 62 inclined generally toward the air side A, however, upon assembly of the shaft 28 through the assembly, in large part due to the auxiliary hinge 68, the auxiliary lip 60 is caused to flex axially toward the oil side O under the bias of the shaft 28 to the installed state (FIG. 1A). The length of the auxiliary lip 60 is sufficient to prevent it from reverse folding toward the air side A in use, with the vent or vents 70 further preventing inadvertent movement of the auxiliary lip 60 toward the air side A.

Figure 2:
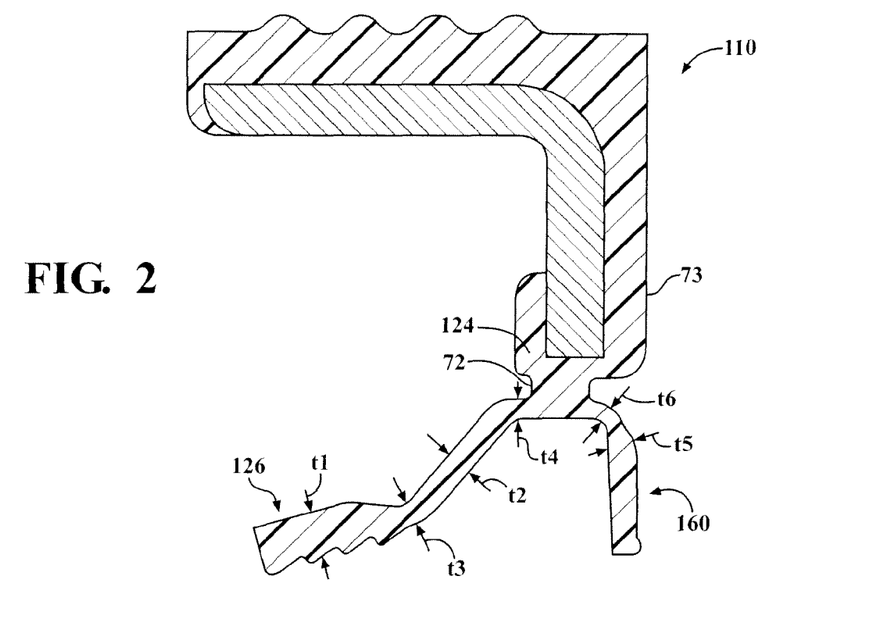
FIG. 2 is a cross-sectional view of a shaft seal assembly constructed in accordance with another aspect of the invention shown in an uninstalled state.
Figure 2A:
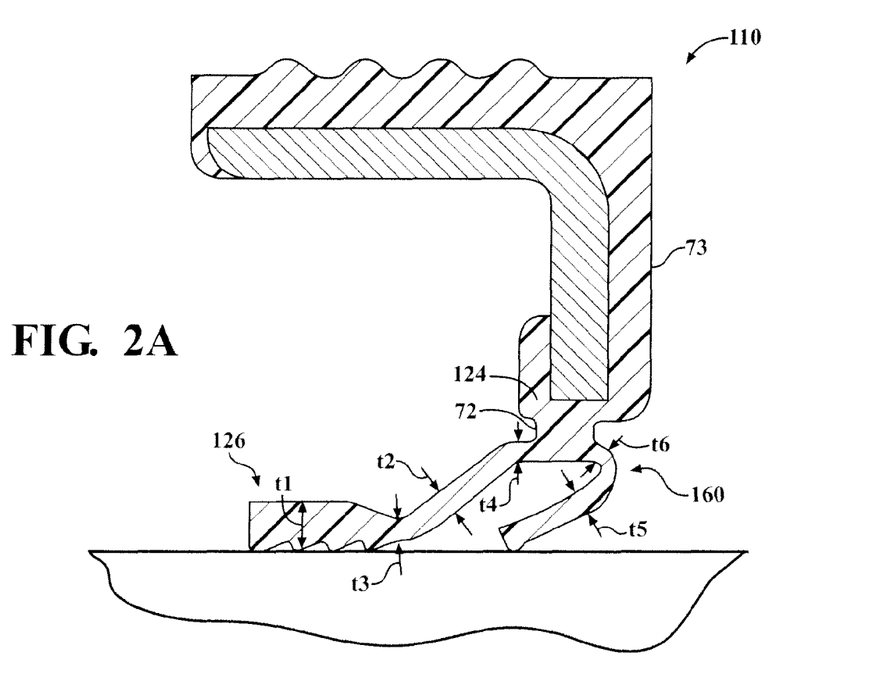
FIG. 2A is a view of the shaft seal assembly of FIG. 2 shown in an installed state on a shaft.

In FIGS. 2 and 2A, a shaft seal assembly 110 constructed in accordance with another aspect of the invention is illustrated, wherein the same reference numerals, offset by a factor of 100, are used to indicated like features discussed above. The assembly 110 is similar to the previously discussed assembly 10, and thus, only the notable differences are discussed.

The seal assembly 110 is similar to the previously discussed seal assembly 10, including a main body 124, a primary seal lip 126, and an auxiliary seal lip 160, however, it also includes a neck region 72 depending from the main body 124, from which the primary and auxiliary seal lips 126, 160 extend. As such, in contrast to the embodiment illustrated in FIGS. 1 and 1A, the auxiliary seal lip 160 is set axially inwardly toward the oil side O of the assembly 110 from an end face 73 of the main body 124. Accordingly, in applications where the end face 73 abuts a housing, the auxiliary seal lip 160 is assured of remaining spaced axially from the housing, and thus, does not pose a concern of interference. Otherwise, the seal 110 includes features as discussed above, including the relative hinge and seal lip thicknesses t1-t6.

Figure 3:
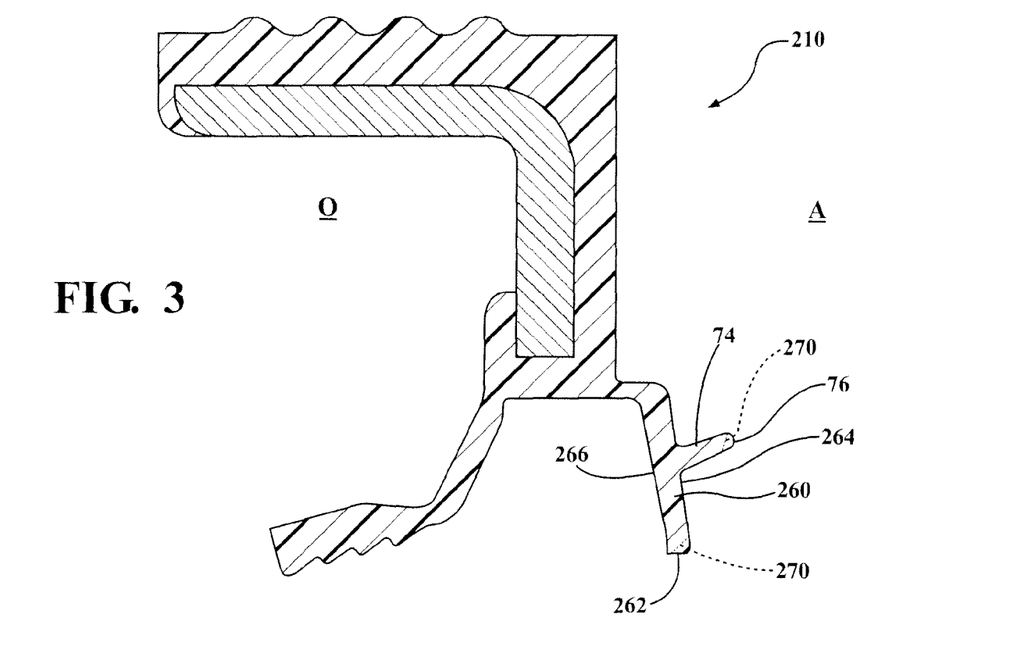
FIG. 3 is a cross-sectional view of a shaft seal assembly constructed in accordance with another aspect of the invention shown in an uninstalled state.
Figure 3A:
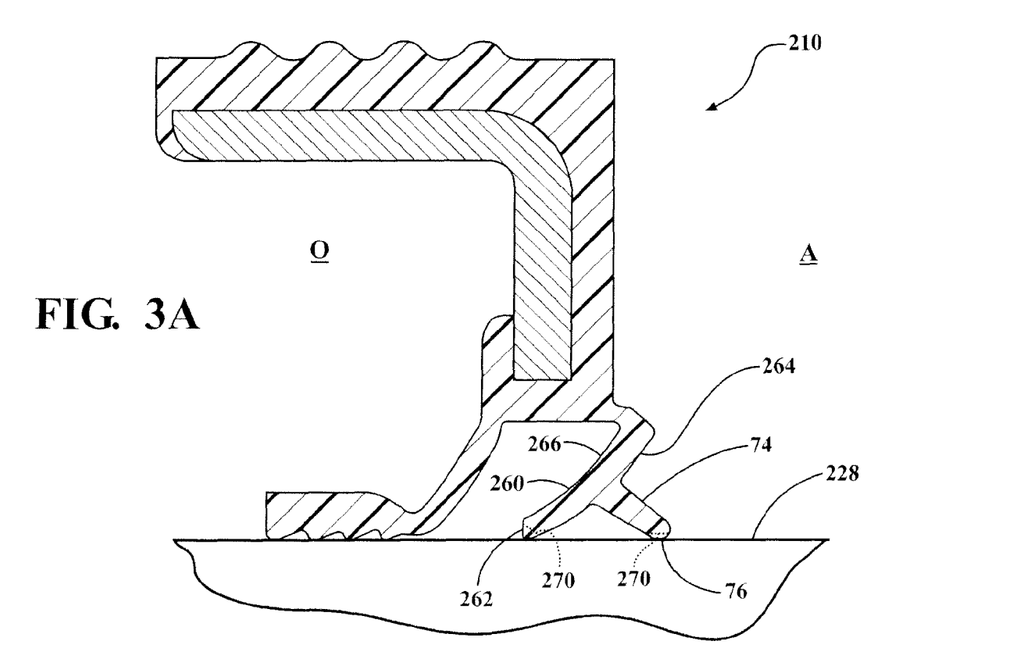
FIG. 3A is a view of the shaft seal assembly of FIG. 3 shown in an installed state on a shaft.

In FIGS. 3 and 3A, a shaft seal assembly 210 constructed in accordance with another aspect of the invention is illustrated, wherein the same reference numerals, offset by a factor of 200, are used to indicated like features to those discussed above. The assembly 210 is similar to the previously discussed assembly 10, and thus, only the notable differences are discussed.

The seal assembly 210 is the same as the previously discussed seal assembly 10, however, in addition to an auxiliary lip 260 as discussed above, it includes a secondary auxiliary lip 74 extending from one of the sides 264, 266 of the auxiliary lip 260, shown as the side 264 facing an air side A of the assembly 210. The secondary auxiliary lip 74 extends toward the air side A of the assembly 210 to a free end 76, shown as diverging outwardly from the auxiliary lip 260 toward the air side A. Upon assembly, the free end 76 of the secondary auxiliary lip 74 is configured to roll downwardly into sealed abutment with a shaft 228, thereby establishing an annular sealed channel between the auxiliary lip 260 and the secondary auxiliary lip 74. The auxiliary lip 260 and the secondary auxiliary lip 74 each have at least one notch, also referred to as vent 270 (FIG. 3) extending into their free ends 262, 76 to relieve or vent the respective auxiliary and secondary lips 260, 74 against the buildup of a pressure gradient across the oil and air sides O, A. Otherwise, the seal assembly 210 is the same as discussed above, including the relative hinge and seal lip thicknesses t1-t6.

Figure 4:
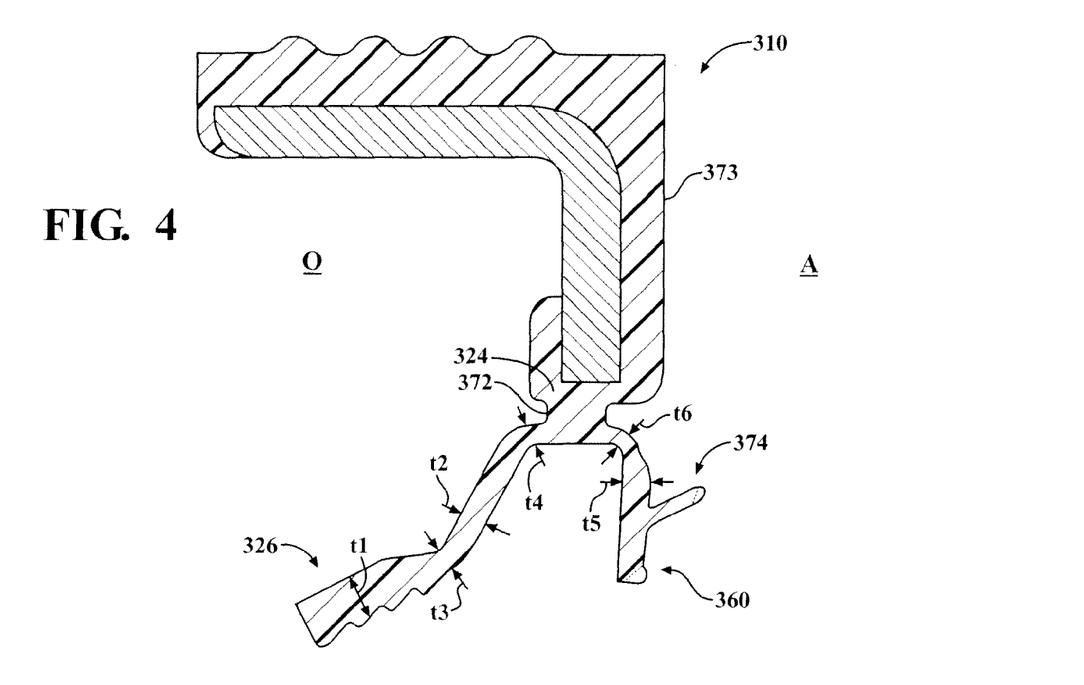
FIG. 4 is a cross-sectional view of a shaft seal assembly constructed in accordance with another aspect of the invention shown in an uninstalled state.
Figure 4A:
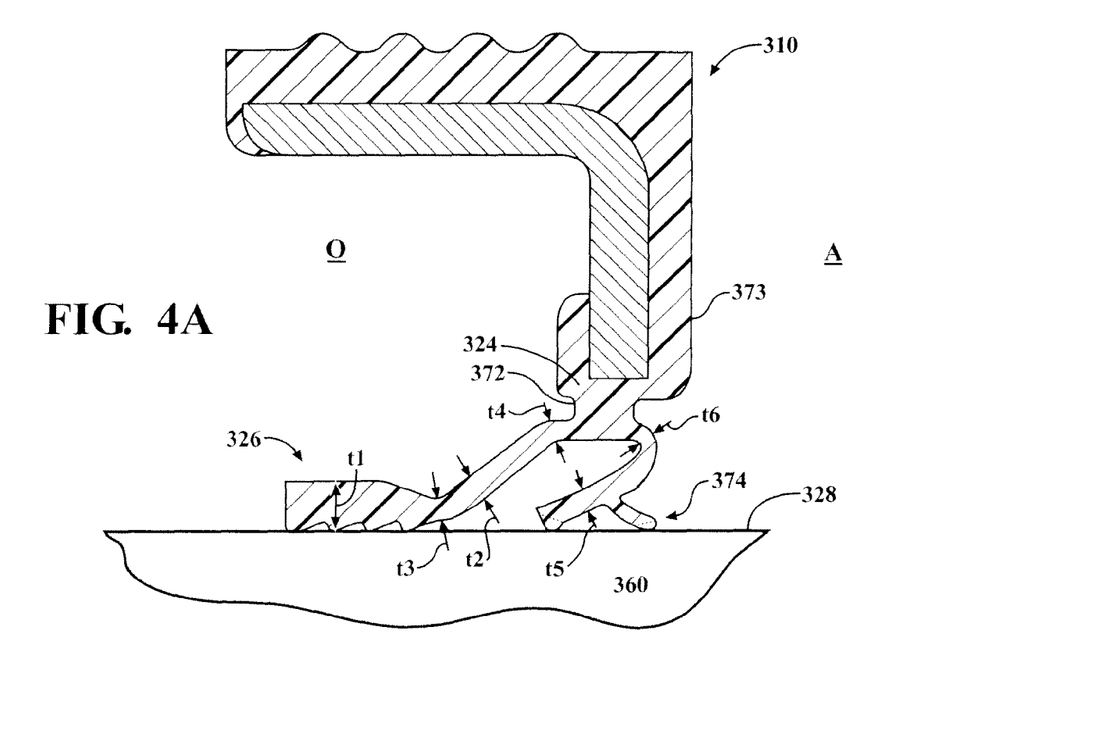
FIG. 4A is a view of the shaft seal assembly of FIG. 4 shown in an installed state on a shaft.

In FIGS. 4 and 4A, a shaft seal assembly 310 constructed in accordance with another aspect of the invention is illustrated, wherein the same reference numerals, offset by a factor of 300, are used to indicated like features to those discussed above. The assembly 310 is similar to the previously discussed assembly 210, and thus, only the notable differences are discussed.

The seal assembly 310 is similar to the previously discussed seal assembly 210, including a main body 324, a primary seal lip 326, an auxiliary seal lip 360, and a secondary auxiliary lip 374, however, it also includes a neck region 372 depending from the main body 324, from which the primary and auxiliary seal lips 326, 360 directly extend. As such, upon completing assembly of the seal assembly 310 on a shaft 328, in contrast to the embodiment illustrated in FIGS. 3 and 3A, the auxiliary seal lip 360 and the secondary auxiliary seal lip 374 is set axially inwardly from an end face 373 of the main body 324 toward the oil side O of the assembly 310. Accordingly, as with the seal assembly 110, the auxiliary seal lip 360 and secondary auxiliary seal lip 374 are assured of remaining spaced axially from the housing, and thus, do not pose a concern of interference. Otherwise, the seal 310 includes features as discussed above, including the relative hinge and seal lip thicknesses t1-t6.

Figure 5:
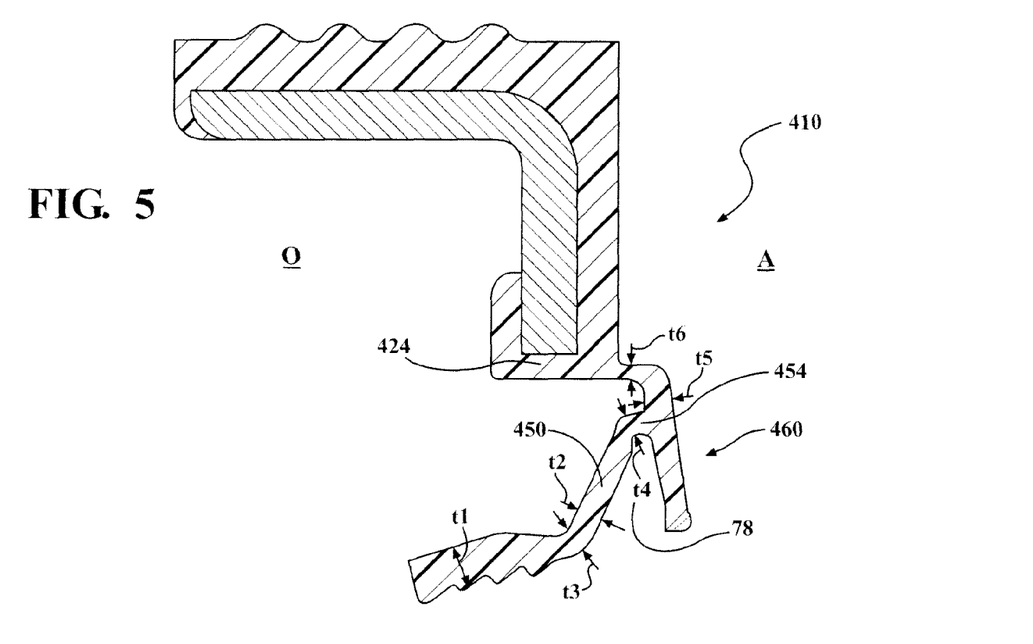
FIG. 5 is a cross-sectional view of a shaft seal assembly constructed in accordance with another aspect of the invention shown in an uninstalled state.
Figure 5A:
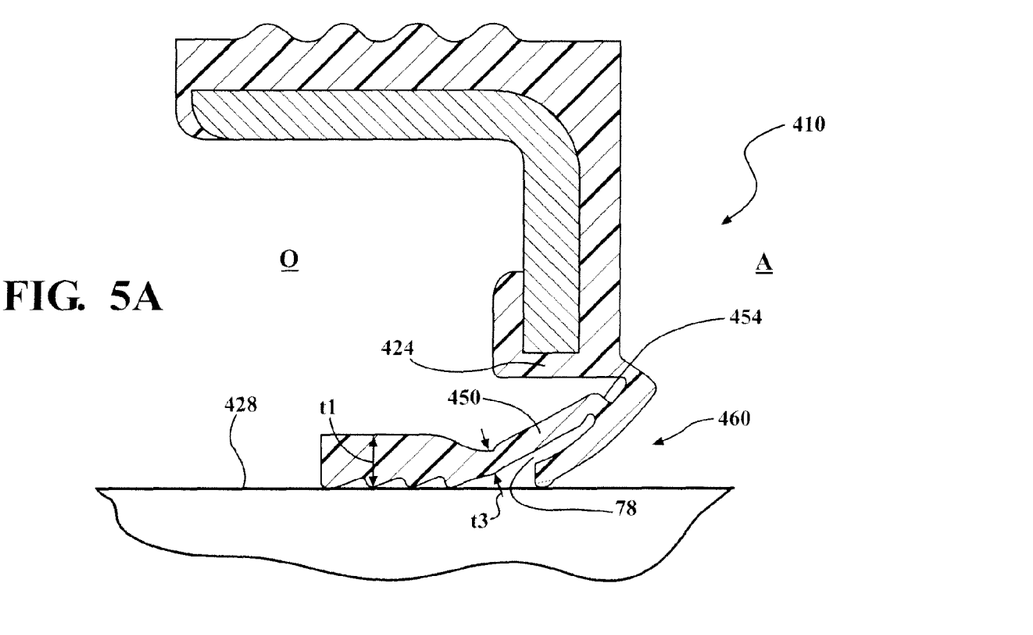
FIG. 5A is a view of the shaft seal assembly of FIG. 5 shown in an installed state on a shaft.

In FIGS. 5 and 5A, a shaft seal assembly 410 constructed in accordance with another aspect of the invention is illustrated, wherein the same reference numerals, offset by a factor of 400, are used to indicated like features discussed above. The assembly 410 is similar to the previously discussed assembly 10, and thus, only the notable differences are discussed.

The seal assembly 410 is the essentially the same as the previously discussed seal assembly 10, however, rather than a bridge 450 being directly attached to a main body 424, the bridge 450 is directly attached to an auxiliary lip 460 via a second hinge 454. The bridge 450 and the auxiliary lip 460, when in their uninstalled state, diverge away from one another to provide a generally V-shaped annular channel 78 therebetween (FIG. 5). Then, upon a shaft 428 being installed through the assembly 410, the V-shaped channel 78 is significantly narrowed (FIG. 5A), with the bridge 450 and auxiliary lip 460 being brought into parallel or substantially parallel relation with one another. Otherwise, the seal 410 includes features as discussed above, including the relative hinges and seal lip thicknesses t1-t6.

Figure 6:
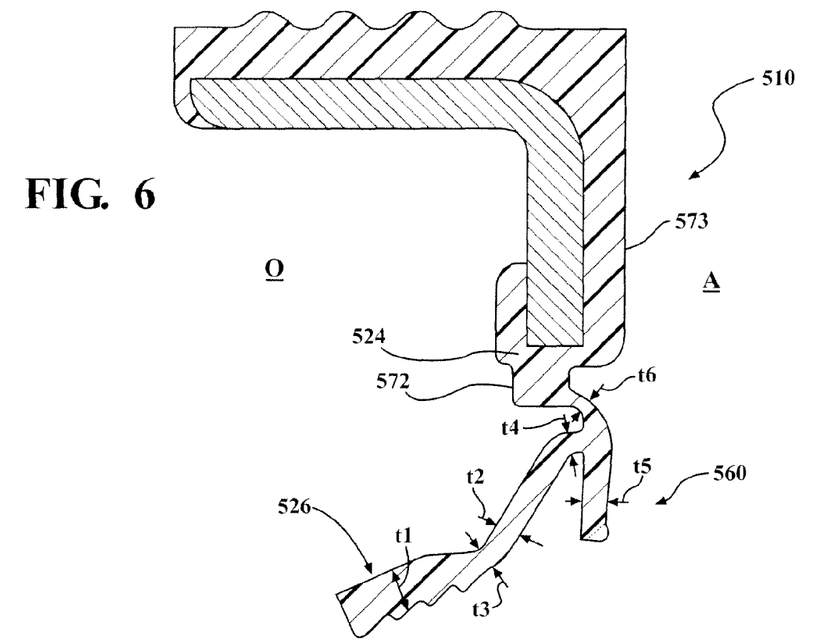
FIG. 6 is a cross-sectional view of a shaft seal assembly constructed in accordance with another aspect of the invention shown in an uninstalled state.
Figure 6A:
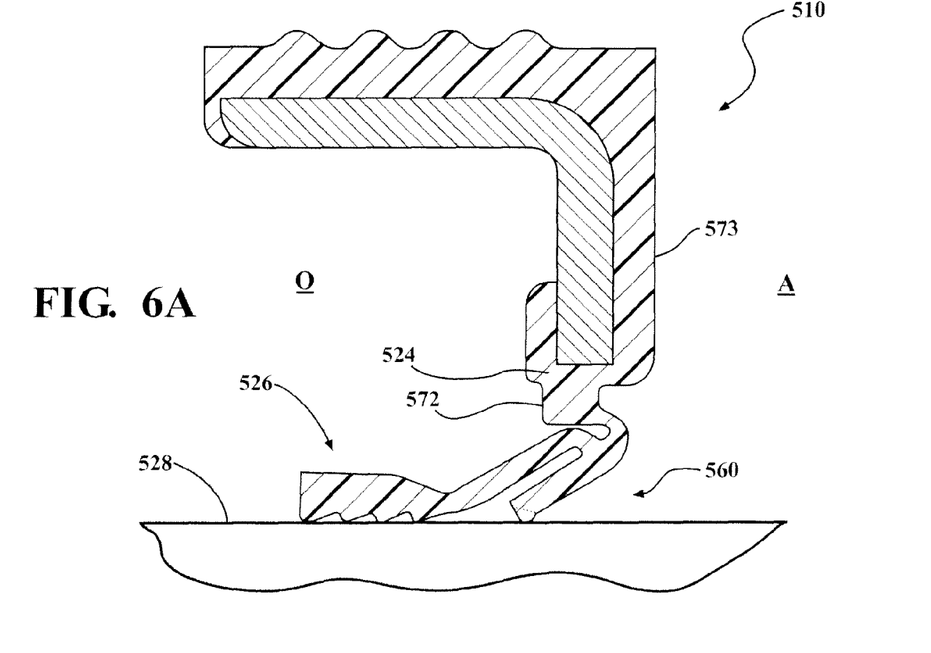
FIG. 6A is a view of the shaft seal assembly of FIG. 6 shown in an installed state on a shaft.

In FIGS. 6 and 6A, a shaft seal assembly 510 constructed in accordance with another aspect of the invention is illustrated, wherein the same reference numerals, offset by a factor of 500, are used to indicated like features discussed above. The assembly 510 is similar to the previously discussed assembly 410, and thus, only the notable differences are discussed.

The seal assembly 510 is similar to the previously discussed seal assembly 410, including a main body 524, a primary seal lip 526, and an auxiliary seal lip 560, however, it also includes a neck region 572 depending from the main body 524, from which the primary and auxiliary seal lips 526, 560 extend. As such, upon completing assembly of the seal assembly 510 on a shaft 528, in contrast to the embodiment illustrated in FIGS. 5 and 5A, the auxiliary seal lip 560 is set axially inwardly from an end face 573 of the main body 524 toward the oil side O of the assembly 510. Accordingly, as with the seal assemblies 110 and 310, the auxiliary seal lip 560 is assured of remaining spaced axially from the housing, and thus, does not pose a concern of interference. Otherwise, the seal 510 includes features as discussed above, including the relative hinges and seal lip thicknesses t1-t6.

Figure 7:
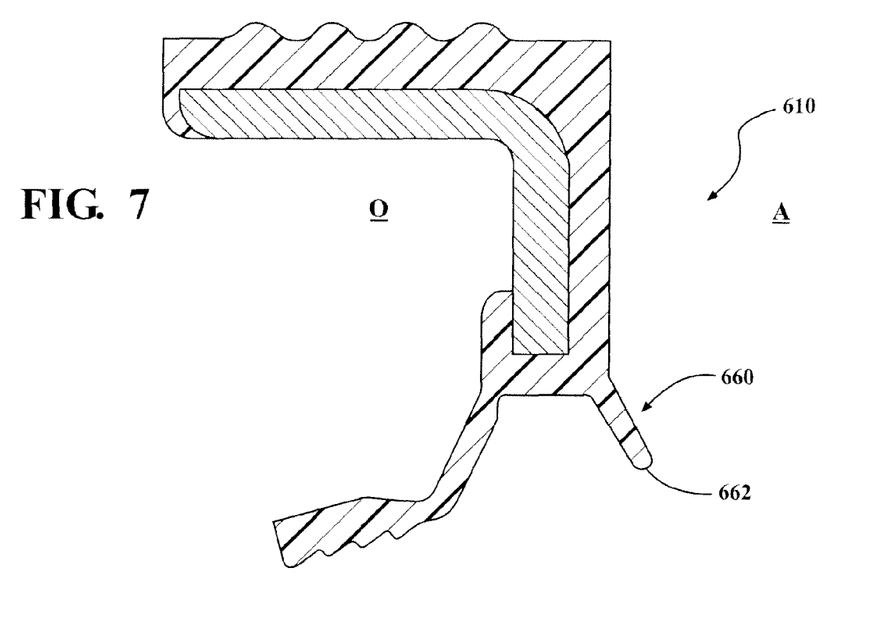
FIG. 7 is a cross-sectional view of a shaft seal assembly constructed in accordance with yet another aspect of the invention shown in an uninstalled state.
Figure 7A:
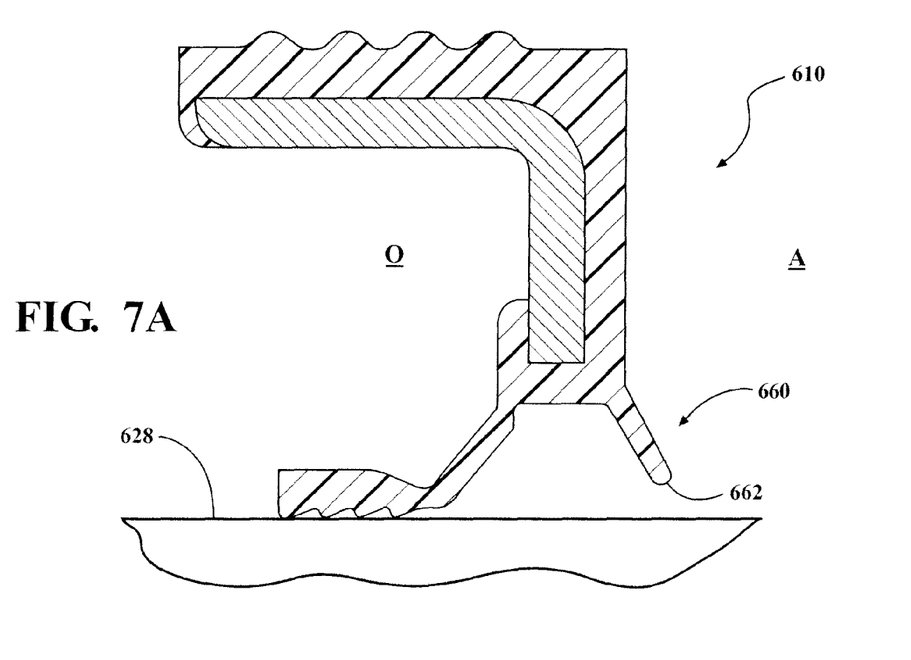
FIG. 7A is a view of the shaft seal assembly of FIG. 7 shown in an installed state on a shaft.

In FIGS. 7 and 7A, a shaft seal assembly 610 constructed in accordance with another aspect of the invention is illustrated, wherein the same reference numerals, offset by a factor of 600, are used to indicated like features discussed above. The assembly 610 is similar to the previously discussed assembly 10, and thus, only the notable differences are discussed.

The seal assembly 610 is the same as the previously discussed seal assembly 10, however, rather than an auxiliary lip 660 being configured to extend into abutment with a shaft 628 and extending toward an oil side O of the assembly 610 upon insertion of the shaft 628 through the assembly 610, the length of the auxiliary lip 660 is reduced so that it remains out of running contact with the shaft 628. As such, a free end 662 of the auxiliary lip 660 remains radially spaced from the shaft 628 upon insertion of the shaft 628 through the assembly 610. Accordingly, the auxiliary lip 660 converges radially inwardly toward an air side A from the main body 624 to the free end 662, wherein the free end 662 remains facing the air side A of the assembly upon assembly, and thus, is not folded via a hinge toward the oil side O upon insertion of the shaft 628 through the assembly 610. Accordingly, the auxiliary lip 660 functions as a non-contact excluder to keep contamination from entering the oil side O. Otherwise, the seal assembly 610 is the same as discussed above with regard to the assembly 10.

Obviously, many modifications and variations of the present invention are possible in light of the above teachings. It is, therefore, to be understood that within the scope of any ultimately allowed claims, the invention may be practiced otherwise than as specifically described.

What is claimed is:

1. A shaft seal assembly, comprising:
an annular metal case having an annular leg extending radially inwardly toward a central axis of the seal assembly to a free end, said leg having opposite oil and air sides facing respective oil and air sides of said seal assembly;
an elastomeric material bonded to said leg, said elastomeric material forming a main body adjacent said free end of said leg and an annular primary seal lip radially inwardly from said main body, said primary seal lip having a thickness extending between a radially outwardly facing backing surface and a radially inwardly facing sealing surface, said sealing surface extending along a length of said primary seal lip from an air side end to a free oil side end and being configured to extend parallel to said central axis along said length against a shaft running surface, said air side end being attached to an annular bridge formed from said elastomeric material via a first hinge and said bridge being operably attached to said main body via a second hinge, said bridge having opposite sides extending across a thickness of said bridge, said first hinge and second hinge each having a thickness less than said thickness of said bridge and said first hinge having a thickness less than said thickness of said primary seal lip; and
further comprising an auxiliary lip extending radially inwardly from said main body to a free end on an air side relative to said primary seal lip, wherein said auxiliary lip has a thickness extending across opposite sides immediately adjacent said main body, said auxiliary lip being attached to said main body by an auxiliary hinge, said auxiliary hinge having a thickness less than said thickness of said auxiliary lip.

2. The shaft seal assembly of claim 1 wherein said bridge is attached directly to said main body via said second hinge.

3. The shaft seal assembly of claim 1 wherein said bridge is attached directly to said auxiliary lip via said second hinge.

4. A shaft seal assembly, comprising:
an annular metal case having an annular leg extending radially inwardly toward a central axis of the seal assembly to a free end, said leg having opposite oil and air sides facing respective oil and air sides of said seal assembly;
an elastomeric material bonded to said leg, said elastomeric material forming a main body adjacent said free end of said leg and an annular primary seal lip radially inwardly from said main body, said primary seal lip having a thickness extending between a radially outwardly facing backing surface and a radially inwardly facing sealing surface, said sealing surface extending along a length of said primary seal lip from an air side end to a free oil side end and being configured to extend parallel to said central axis along said length against a shaft running surface, said air side end being attached to an annular bridge formed from said elastomeric material via a first hinge and said bridge being operably attached to said main body via a second hinge, said bridge having opposite sides extending across a thickness of said bridge, said first hinge and second hinge each having a thickness less than said thickness of said bridge and said first hinge having a thickness less than said thickness of said primary seal lip; and
further comprising an auxiliary lip extending radially inwardly from said main body to a free end on an air side relative to said primary seal lip, wherein said auxiliary lip is configured to abut the shaft with said free end of said auxiliary lip facing said primary seal lip.

5. The shaft seal assembly of claim 4 wherein said auxiliary lip has at least one notch extending into said free end of said auxiliary lip to form a vent in said auxiliary lip.

6. The shaft seal assembly of claim 4 wherein said auxiliary lip has a thickness extending across opposite sides immediately adjacent said main body, said auxiliary lip being attached to said main body by an auxiliary hinge, said auxiliary hinge having a thickness less than said thickness of said auxiliary lip.

7. The shaft seal assembly of claim 4 wherein said auxiliary lip has opposite sides and further comprising a secondary auxiliary lip extending directly from one of said sides of said auxiliary lip.

8. The shaft seal assembly of claim 7 wherein said secondary auxiliary lip diverges away from said auxiliary seal lip and extends toward said air side of said shaft seal assembly to a free end.

9. The shaft seal assembly of claim 8 wherein said secondary auxiliary lip is configured to abut the shaft.

10. The shaft seal assembly of claim 9 wherein said auxiliary lip and said secondary auxiliary lip each have at least one notch extending into their free ends to vent an annular channel between said auxiliary lip and said secondary auxiliary lip.

* * * * *